United States Patent
Spingler (10) Patent No.: US 7,766,386 B2
(45) Date of Patent: Aug. 3, 2010

(54) ENERGY ABSORBING PADDING FOR AUTOMOTIVE APPLICATIONS

(75) Inventor: Gregory Spingler, Saint-Amand-les-Eaux (FR)

(73) Assignee: Visteon Global Technolgies, Inc., Van Buren Township, MI (US)

( * ) Notice: Subject to any disclaimer, the term of this patent is extended or adjusted under 35 U.S.C. 154(b) by 733 days.

(21) Appl. No.: 11/602,838

(22) Filed: Nov. 21, 2006

(65) Prior Publication Data

US 2007/0147956 A1    Jun. 28, 2007

(30) Foreign Application Priority Data

Nov. 21, 2005    (FR) .................................. 05 11774

(51) Int. Cl.
   B60R 21/00    (2006.01)
   E01F 15/14    (2006.01)

(52) U.S. Cl. .......................................... 280/751; 404/6

(58) Field of Classification Search ..................... 404/6, 404/9, 10; 280/751, 752
   See application file for complete search history.

(56) References Cited

U.S. PATENT DOCUMENTS

| | | | | |
|---|---|---|---|---|
| 4,083,033 A | * | 4/1978 | Kulp et al. | 340/908 |
| 4,674,911 A | * | 6/1987 | Gertz | 404/6 |
| 4,890,877 A | * | 1/1990 | Ashtiani-Zarandi et al. | 296/146.7 |
| 5,026,204 A | * | 6/1991 | Kulp et al. | 404/10 |
| 5,549,327 A | * | 8/1996 | Rusche et al. | 280/751 |
| 5,755,528 A | * | 5/1998 | Kulp et al. | 404/6 |
| 5,868,520 A | * | 2/1999 | Kulp et al. | 404/6 |
| 6,338,311 B1 | * | 1/2002 | Ho | 116/63 C |
| 6,536,818 B1 | * | 3/2003 | Moss | 293/134 |
| 6,604,888 B2 | * | 8/2003 | Dolan | 404/6 |
| 6,702,345 B1 | | 3/2004 | Yoshida | |
| 2002/0070584 A1 | * | 6/2002 | Carroll et al. | 296/189 |
| 2004/0089988 A1 | * | 5/2004 | Scott et al. | 267/140.11 |

FOREIGN PATENT DOCUMENTS

| | | |
|---|---|---|
| EP | 0 683 072 A1 | 11/1995 |
| EP | 2 792 384 A | 10/2000 |
| FR | 1 555 140 A | 1/1969 |
| FR | 2 014 205 A | 4/1970 |
| FR | 2 747 445 A | 10/1997 |

* cited by examiner

*Primary Examiner*—Raymond W Addie
(74) *Attorney, Agent, or Firm*—Brinks Hofer Gilson & Lione (57) ABSTRACT

An energy absorber device having a hollow body of generally conical shape. The hollow body is formed by at least two truncated or cylindrical segments, aligned with each other along their axes of extension and/or symmetry, with successive sections being of decreasing width. The various truncated or cylindrical segments are connected to each other by intermediate portions defining, with the aforementioned segments, recesses or steps. The hollow body can be crushed into itself by a return of the segments of smaller dimension into the adjacent segments of larger dimension, generally telescopically. The device is dimensioned such that the base segment has a height equal to X and the other segments of smaller width have a height corresponding to about 2X.

20 Claims, 7 Drawing Sheets

Fig. 8C space not utilized optimal solution
(present invention)

material not utilized

ENERGY ABSORBING PADDING FOR AUTOMOTIVE APPLICATIONS

BACKGROUND AND SUMMARY

The present invention relates to the field of energy absorption, in particular energy generated in connection with shock or impact forces, by means of passive devices being subjected to crushing or deformation, particularly for applications in the automotive field. The present invention relates more specifically to an energy absorber device in the form of a hollow conical or truncated body and a filling element comprising a plurality of such devices.

In numerous applications, it is necessary to provide safety means to absorb the energy resulting from a shock or impact. This is the situation in motor vehicles, particularly in the region of the doors so as to absorb the energy released during lateral shock resulting from impact to the side of said vehicle.

Various types of energy absorbers are already known and operate based on the principle of deformation under stress, typically between two surface elements, such as plates, layers or metal sheets. Thus, the use of one or more blocks of foam, of suitable density and rigidity, as an absorber element(s) is known. However, when the possible deformation distance is great (such as the vehicle's plates being separated by a large distance), the volume of foam needed to fill the void is equally great, producing an unacceptable and significant increase in cost and/or weight.

The use of hollow elongated bodies as energy absorbers is also known. These bodies are generally of plastic material or are plastically deformable, and are deformed by crushing under the action of pressure greater than a given intensity. The hollow bodies may, for example, be cylindrical or conical in shape and may be combined in a cellular structure or have the form of separate hollow bodies connected by a common base plate.

Figure 1A:
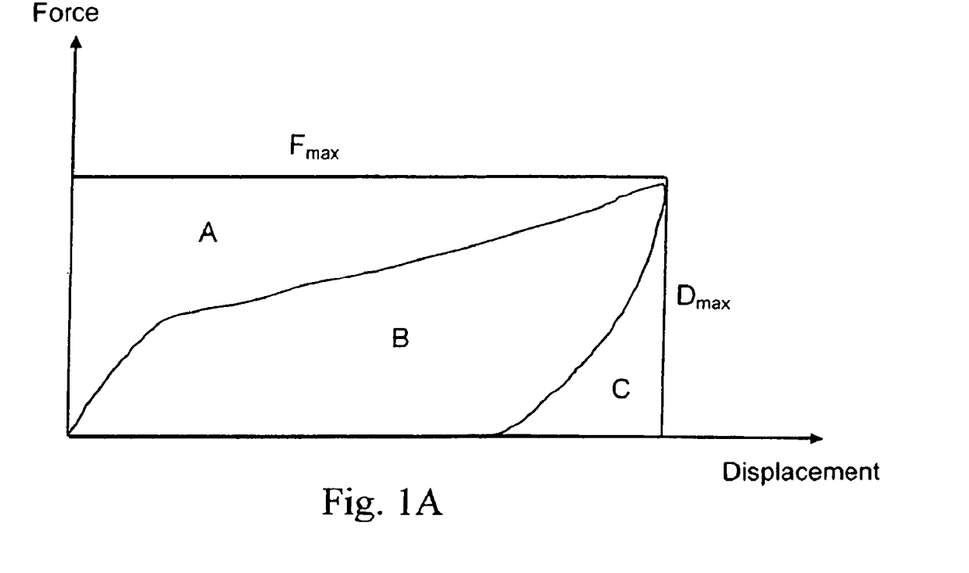
FIG. 1A is force/displacement curve for a known variety of energy absorption devices.

The energy absorption process of the known absorbers of this type is illustrated in a simplified manner in FIG. 1A, in the form of a force, or absorbed energy, curve versus on the displacement or the degree of crushing. The maximum permitted force (the force transmitted by the absorber during crushing) is generally set (by the constructor or by safety regulations) and the maximum permitted displacement is determined by the thickness available for filling or between the surface elements subject to impact, such as the inner and outer panels of a door.

Figure 1B:
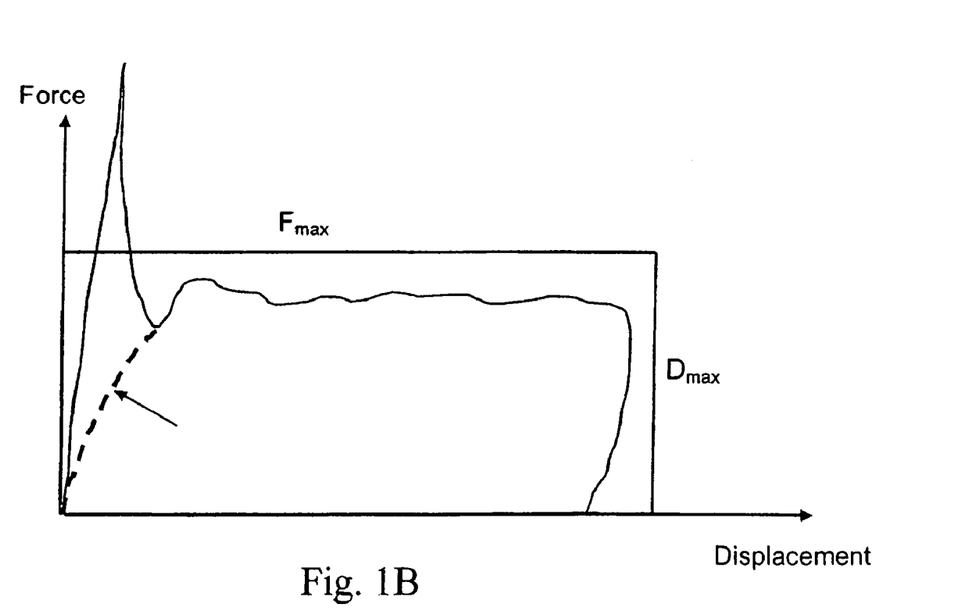
FIG. 1B is a force/displacement curve for another known variety of energy absorption devices.

In FIG. 1A, region A represents the energy potential that is not used by the absorber device, having been lost during crushing; region B represents the energy that is effectively absorbed by the device; and region C represents the energy released by the device (the rebound effect). The purpose of recent and current improvements is to reduce region A, with a view to absorbing a greater part of the energy when crushing begins following impact, to increase region B, and to control the intensity of the force transmitted (the plateau). However, known solutions that attempt to meet this objective do not comply with the ideal increase in resistance to crushing, depending on the degree of crushing, that is required. In fact, they all typically show an initial peak of resistance to significant deformation. This does not comply with the protection and safety arrangements being sought after since deformation only begins after a high level of intensity of the compression or pressure stress. This initial peak is seen in FIG. 1B.

An optimal energy absorption process, such as the one presently sought, should provide constant resistance to deformation during crushing (the stress plateau), or at the very least during a phase of significant initial deformation. Such a force curve diagram is seen in FIG. 3.

Figure 2:
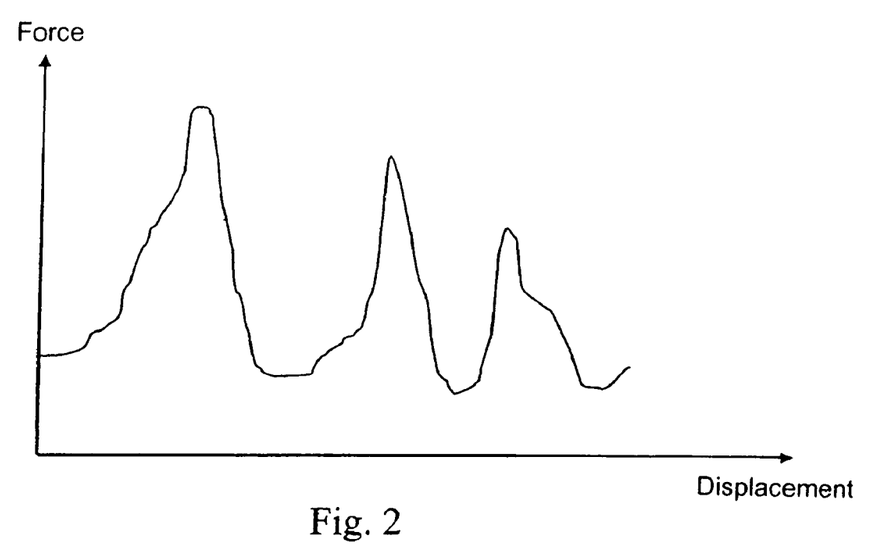
FIG. 2 is a force/displacement curve for yet another variant of energy absorption device.
Figure 3:
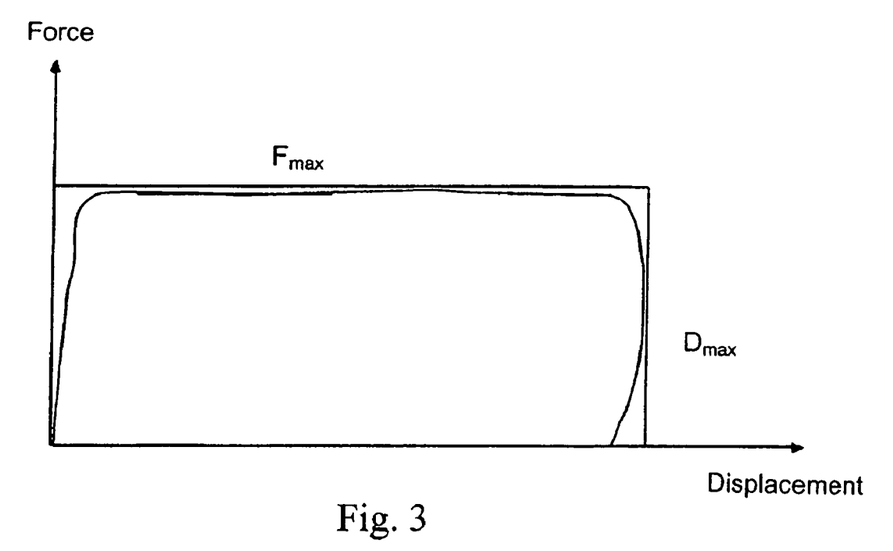
FIG. 3 is a force/displacement curve for an optimal energy absorption process.

In an attempt to move towards the sought after optimal deformation process of FIG. 3, the production of hollow, conical stepped or tiered bodies, with preferred lines of rupture between steps, has been proposed (see for example EP-A-0 244 579, FR-A-2 797 669 and EP-A-0 673 072). This solution provides an energy absorption curve (force/displacement) (see FIG. 2) formed by a series of peaks, each corresponding to rupture in the region of one of the steps. This energy absorption curve, however, is not the ideal process that is being sought.

It has also been proposed to produce a hollow stepped body in which the steps have different resistances to crushing (see for example U.S. Pat. No. 3,998,485). This solution also gives an unsatisfactory energy absorption curve which is in the form of a series of peaks.

Another known solution proposes is an arrangement of hollow conical bodies of different heights or sizes (see for example FR-A-2 784 151). By distributing the initial peaks of resistance to deformation over a given crushing range, this allows a pseudo plateau of stress to be obtained, which is made up of adjacent peaks on a reference surface (comprising bodies of different sizes). However, such an arrangement still has undesirable peaks of stress in the locality of the crushing.

A further solution involves producing prior crushing or weakening of an aforementioned absorber device at the initial peak so as to eliminate a significant peak. This is represented by the broken line on FIG. 1B. However, this results in an additional manufacturing operation and a reduction in the overall energy that can be absorbed.

An energy absorber device, see FR-A-2 777 332, and consists of a hollow, generally cone-shaped body, the envelope of which is formed of at least two hollow stepped segments, of which the individual envelopes are of the same type of shape, are truncated or cylindrical, and are aligned with each other in an extension direction. The sections are of decreasing dimensions, at least on the outside, from an end segment forming the base step to the opposite end segment forming the top step of the body. The various truncated or cylindrical segments are connected to each other by an intermediate envelope portion or portions defining, with the aforementioned segments, tiers. The hollow body is suitable for being crushed into itself by return or reversal of the segment(s) of smaller section into the adjacent segment(s) of larger section, telescopically under the action of a pressure force, in the direction of alignment or extension, with an intensity greater than a predetermined value. The intermediate envelope portions respectively serve as initiation, return or reversal zones for the cylindrical segments of which they form the bases. The energy absorption process occurs with a plateau of relatively constant stress during crushing, this crushing occurring by reversal of the various steps. However, this device is not optimised in terms of the amount of energy absorbed per unit of height of the device, or in terms of resistance to buckling in the region of the recesses between successive steps (which may require the addition of supplementary reinforcement ribs, which may cause a peak of stress when crushing begins).

Accordingly, one object of the present invention is to overcome at least some of the limitations mentioned above, and in particular to improve upon the known energy absorber device.

In achieving the above, the present invention provides an energy absorber device characterised by a series of segments: a segment forming the base step having a height X and at least one other segment of smaller width having a height "h" corresponding to about, or preferably equal to, 2X.

BRIEF DESCRIPTION OF THE DRAWINGS

The invention will be better understood with the help of the description below, which relates to preferred embodiments, given as non-limiting examples, and explained with reference to the accompanying diagrammatic drawings, in which.

DETAILED DESCRIPTION OF THE INVENTION

Figure 4A:
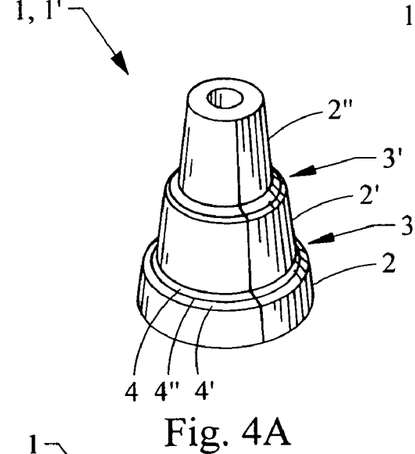
FIGS. 4A and 4B are perspective views of two variants, with two and three steps respectively, of an energy absorber device according to a first embodiment of the invention and having conical segments and a single wall.
Figure 4B:
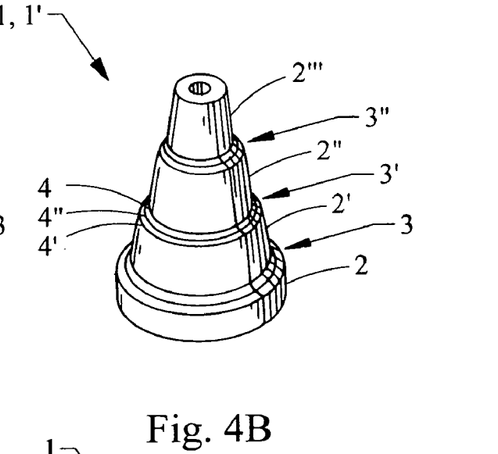
Figure 5A:
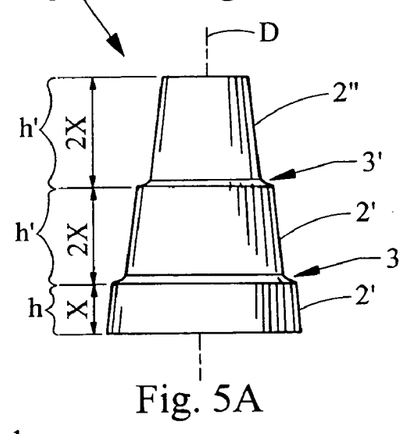
FIGS. 5A and 5B are side elevational views of the two variant embodiments illustrated in FIGS. 4A and 4B respectively.
Figure 5B:
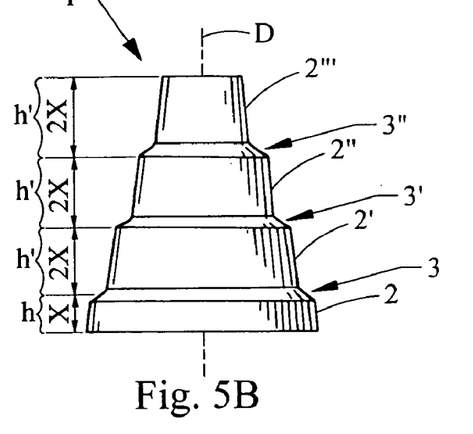

FIGS. 4 to 6, 10, 11 and 13 each show an energy absorber device 1 having a hollow body 1' of a generally truncated conical shape, of which the envelope consists of a series of hollow stepped segments 2, 2', 2", 2''', three and four step segments being respectively shown in FIGS. 4A and 4B, but only at least two being required. Preferably, each of these hollow stepped segments have individual truncated conical (hereinafter just "truncated") or cylindrical envelopes, their shapes being of the same general type and being aligned with each other in an extension direction D. The stepped segments decrease in their width dimension from a first end segment 2 forming the base and step up to a second segment 2', and continuing until reaching the opposite end segment 2", 2''' forming the top step of said body 1'.

The various truncated or cylindrical segments 2, 2', 2", 2''' are connected to each other by an intermediate portion or portions 3, 3', 3", defining steps or recesses between the aforementioned segments. The hollow body 1' is suitable for being crushed into itself by return or reversal of the smaller segment(s) into the adjacent larger segment(s), generally telescopically, under the action of a pressure force in the direction of alignment or extension D of which the intensity is greater than a predetermined value. The intermediate portions 3, 3', 3" serve as return or reversal start zones for the truncated or cylindrical segments 2, 2', 2", 2''' of which they respectively extend the bases (the part turned towards the next segment of larger section).

According to the invention, provision is made for the segment 2 forming the base to have a height (h) equal to X in the alignment or extension direction D. The other smaller diameter segment(s) 2', 2", 2''' have a height (h') corresponding to, or preferably equal to, about 2X. The dimensional rule imposed by the invention as disclosed above allows for optimising of the amount of energy that is absorbed.

Figure 7:
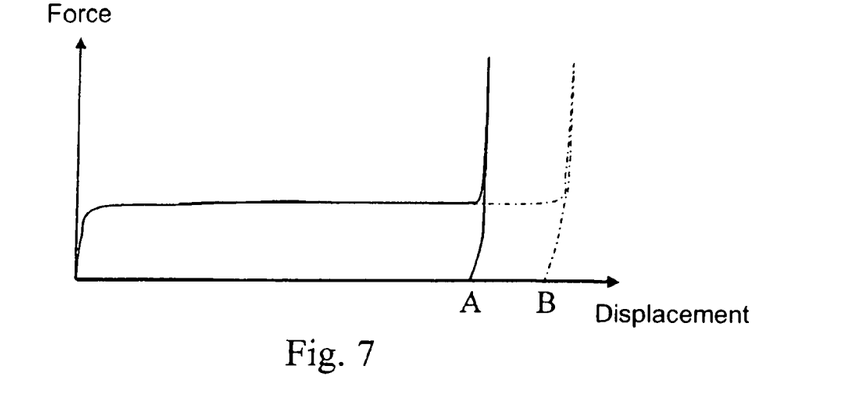
FIG. 7 illustrates stress/crushing curves for an energy absorber device according to the invention comprising, respectively, two steps (the unbroken line of curve A/obtained for example with a device according to FIG. 4A) and three steps (the broken line of curve B/obtained for example with a device according to FIG. 4B)

As shown in FIG. 7, the particular form of the disclosed absorber device 1 allows a plateau of constant stress to be obtained from about the time of impact and throughout the axial crushing of the body 1', before finally generating a large peak of stress at the end of crushing processes and at the end of the plateau.

This relative adjustment of the heights (h) and (h') makes it possible, at a constant height, to absorb more energy by more consistent crushing. In fact, by taking X as the height of the step 2 of largest/widest section, then 2X for all of the other steps 2', 2", 2''' (whatever the number thereof), plastic folding by the reversal phenomenon of the steps of height 2X (folded in two which allows a return, after deformation, to a height X) during crushing is optimised. In this way, the plateau of stress will be constant over a larger displacement (or crushing distance) (see FIG. 7) before reaching the final peak of stress generated by crushing the stack of all the steps folded concentrically into the step 2 with the greatest transverse dimension.

As a result, to absorb an identical amount of energy as a previously known energy absorption device, the total height of the optimised device 1 may be smaller, which allows a reduction in size of the device, for example, in the door of a motor vehicle.

Figure 8A:
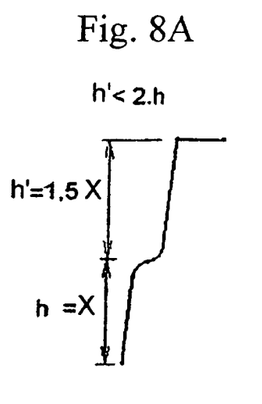
FIGS. 8A, 8B and 8C are partial schematic sectional views, before deformation, of the wall of an absorber device having two steps with different height ratios between the base and top steps, with FIG. 8B corresponding to the height ratio according to the invention.
Figure 8B:
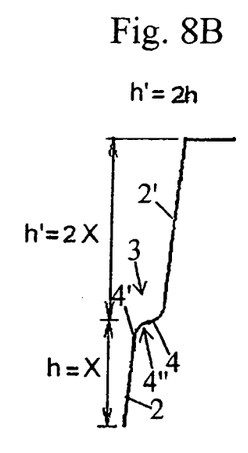
Figure 8C:
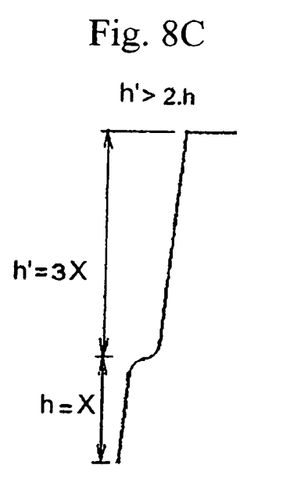
Figure 9A:
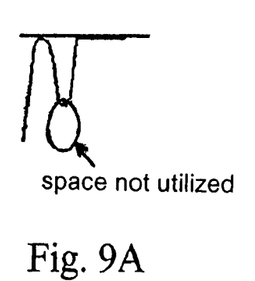
FIGS. 9A, 9B and 9C are partial schematic sectional views of the devices of FIGS. 8A, 8B and 8C, respectively, after crushing.
Figure 9B:
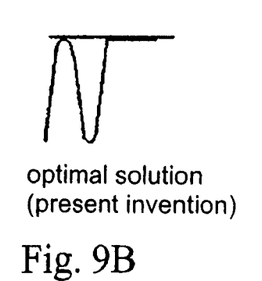
Figure 9C:
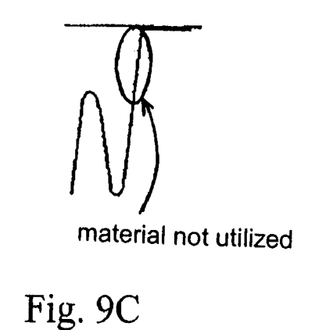

If the rule of height ratios, as defined above, is not respected, certain areas of the body of the absorber device 1 will not be stressed during crushing, which leads to a total height greater than that which is effectively necessary (FIGS. 8A and 9A) or which generates a premature peak or increase in the plateau of stress (FIGS. 8C and 9C).

Preferably, each intermediate portion 3, 3', 3", connecting two adjacent segments 2, 2', 2", 2''', has a first curved area 4 extending the base of the smaller width segment 2', 2", 2''' towards the outside in a flared or concave manner and a second curved area 4' extending the top of the larger width segment 2, 2', 2" towards the inside in a domed or convex manner, with these two areas 4 and 4' being connected at a line of inflection 4".

Thus, each intermediate portion 3, 3', 3" forms a sort of hinge configured to initiate and transmit the return movement by rotation of the wall of the envelope of the hollow body 1'. Each area forming a hinge will, when being crushed, roll down the material and harden, so that the material of the wall rolls down progressively over an instantaneously movable hinge (at each moment during crushing the instantaneous centre of rotation changes because the material is rolling down).

The absorber device 1 comprises, in the most elementary version thereof, two steps or segments 2 and 2'. Preferably the device 1 includes at least three 2, 2' and 2" or even four 2, 2', 2", 2''' segments (the variation in the curve of stress/crushing between a device with two steps (solid line) and one with three steps (dashed line) is illustrated in FIG. 7 and results in an extension of the plateau of resistance to crushing at constant stress and in the displacement of the final peak).

The width of the hollow body 1' may or may not be of a constant thickness over its entire height.

Accordingly, the walls of the various segments 2, 2', 2", 2''', on the one hand, and the walls of the various intermediate portions 3, 3', 3", on the other hand, respectively have identical thicknesses, with the thickness of the intermediate portions 3, 3', 3" being less than that of the segments 2, 2', 2", 2''' so that crushing with plastic return of the hollow body 1' progressively affects the segments 2, 2', 2", 2''', beginning with the segment 2" or 2''' having the smallest width dimension and forming the top step. The edge of the free end thereof may be possibly of increased thickness (to serve as a support zone and a zone for transmission of the impact or compression force). With this variant, a curve of crushing is obtained substantially of the type illustrated in FIG. 7.

According to another variant, the wall of at least one of the various segments 2, 2', 2", 2''' may have a different thickness, in particular a greater thickness, than that of the walls of the other segments 2, 2', 2", 2''', with the intermediate portions 3, 3', 3" having walls of the same thickness or not. Thus, by providing a segment or segments with a different wall thickness from that of the other segments, it is possible to arrive at force/displacement curve with at least two plateaus, instead of a single plateau as in FIG. 7.

In addition, the segments 2, 2', 2" may or may not consist of hollow bodies of symmetrical structure, or even of a structure generated by revolution, with intermediate annular portions.

Nevertheless, it is advantageous in terms of manufacturing reliability and symmetrical distribution of stress, the directrices of cylindrical segments or the perimeters of the bases of the truncated segments 2, 2', 2", 2''' be chosen from the group of geometric figures having a center of symmetry, the direction of alignment and extension D of the hollow segments 2, 2', 2", 2''' being in that case identical to the axis of symmetry thereof. By way of examples, these centrally symmetrical figures may comprise circles, squares, rectangles, rhombi, regular polygons with an even number of sides, crosses or similar (as generally shown in FIGS. 4, 10, 11 and 13B).

Figure 13A:
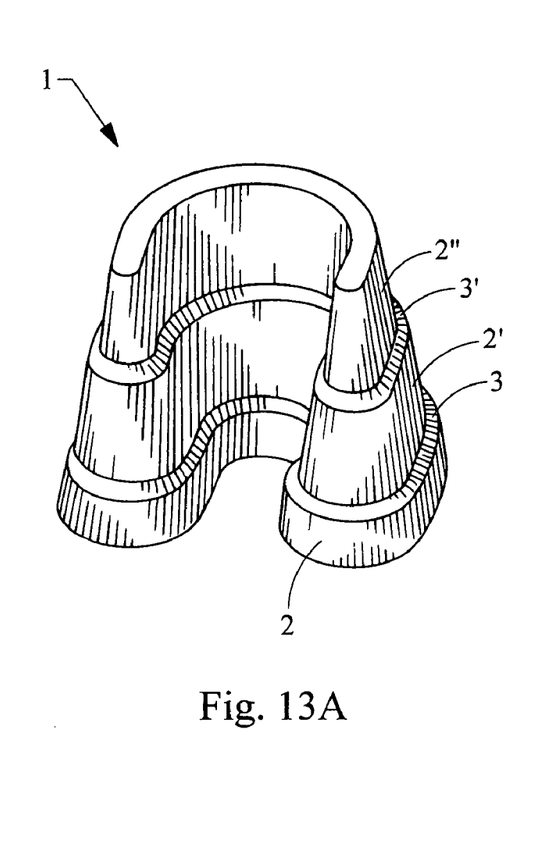
Figure 13B:
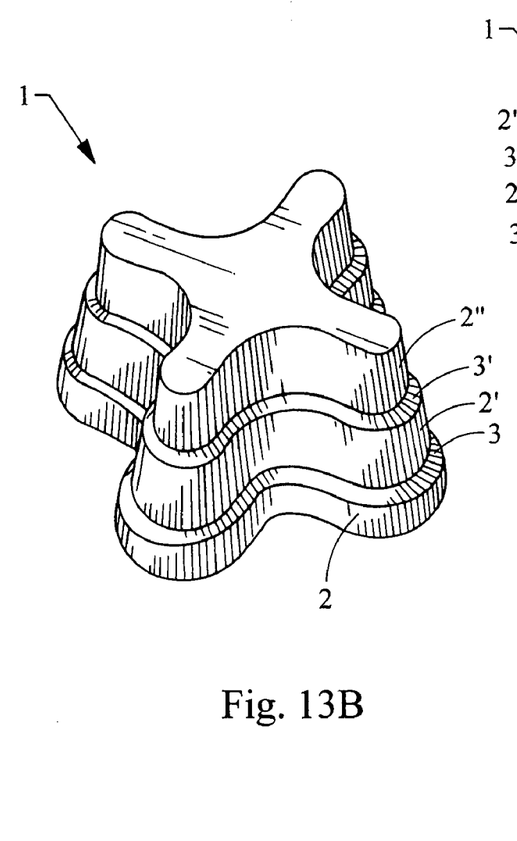
Figure 13C:
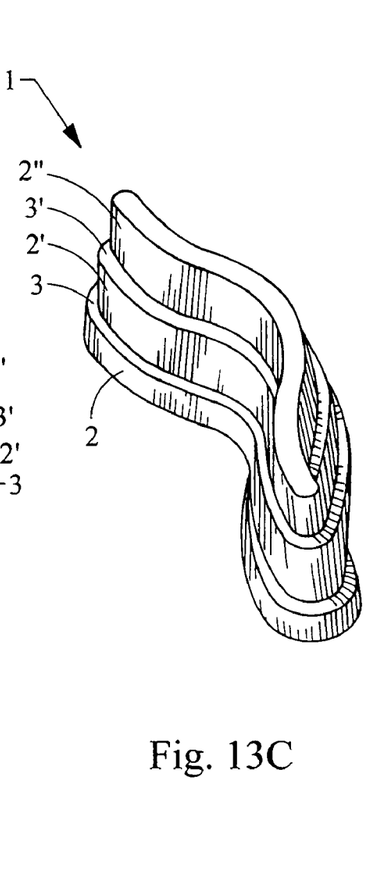

In a variant, provision can also be made for the directrices of the cylindrical segments or the perimeters of the bases of the truncated segments 2, 2', 2", 2''' to be chosen from the group of geometric figures having at least one axis of symmetry. In that case, the segments 2, 2', 2", 2''' each having at least one plane of symmetry; the planes of symmetry of the various segments 2, 2', 2", 2''' being identical to each other. By way of examples, these figures of flat symmetry may comprise triangles, ellipses, polygons with an uneven number of sides, portions of sine waves (or wavelets), U- and T-shapes or similar (FIGS. 13A and 13C). Such hollow bodies 1' do not necessarily comprise a central, open, traversing orifice.

Generally, the hollow body 1' may or may not be completely open on the end of the segment 2', 2", 2''' forming the top. Preferably, but not necessarily, the segment will have at this end a support rim extending radially inward, providing a support surface. At the opposite end, the segment 2 forming the base may have an external support rim, extending radially outward from the base of the segment 2 towards the outside.

Figure 6:
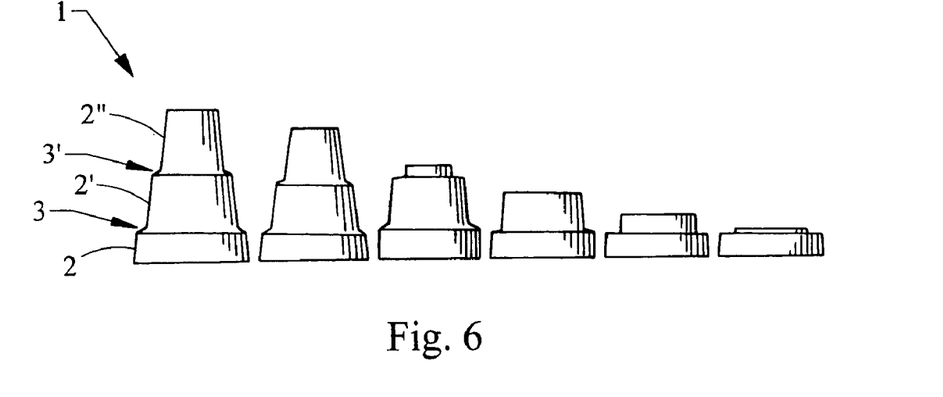
FIG. 6 illustrates, in six sequences, the crushing under stress of an energy absorber device as illustrated in FIGS. 4A and 5A.

According to a first embodiment, seen in particular in FIGS. 4 to 6 of the accompanying drawings, the absorber device 1 comprises a single envelope forming a hollow body 1' with a single wall.

Figure 10A:
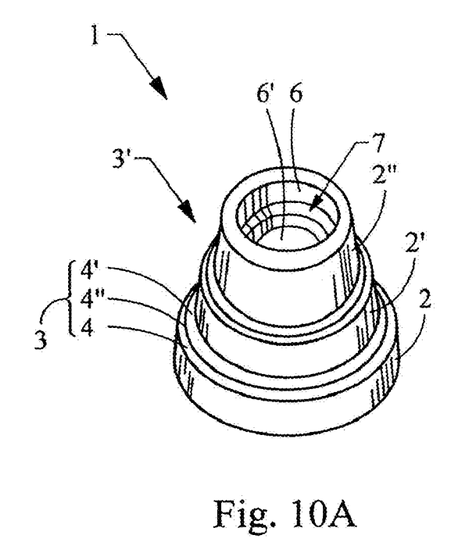
FIGS. 10A and 10B are views, respectively in top perspective and transparently, of a variant of a three-step, double-walled energy absorber device, according to another embodiment of the invention.
Figure 10B:
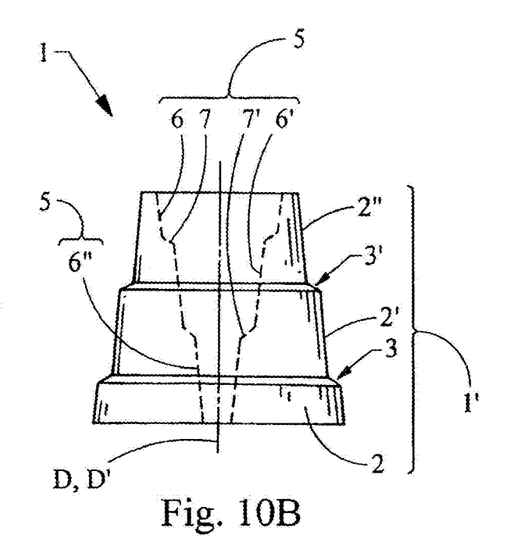
Figure 11:
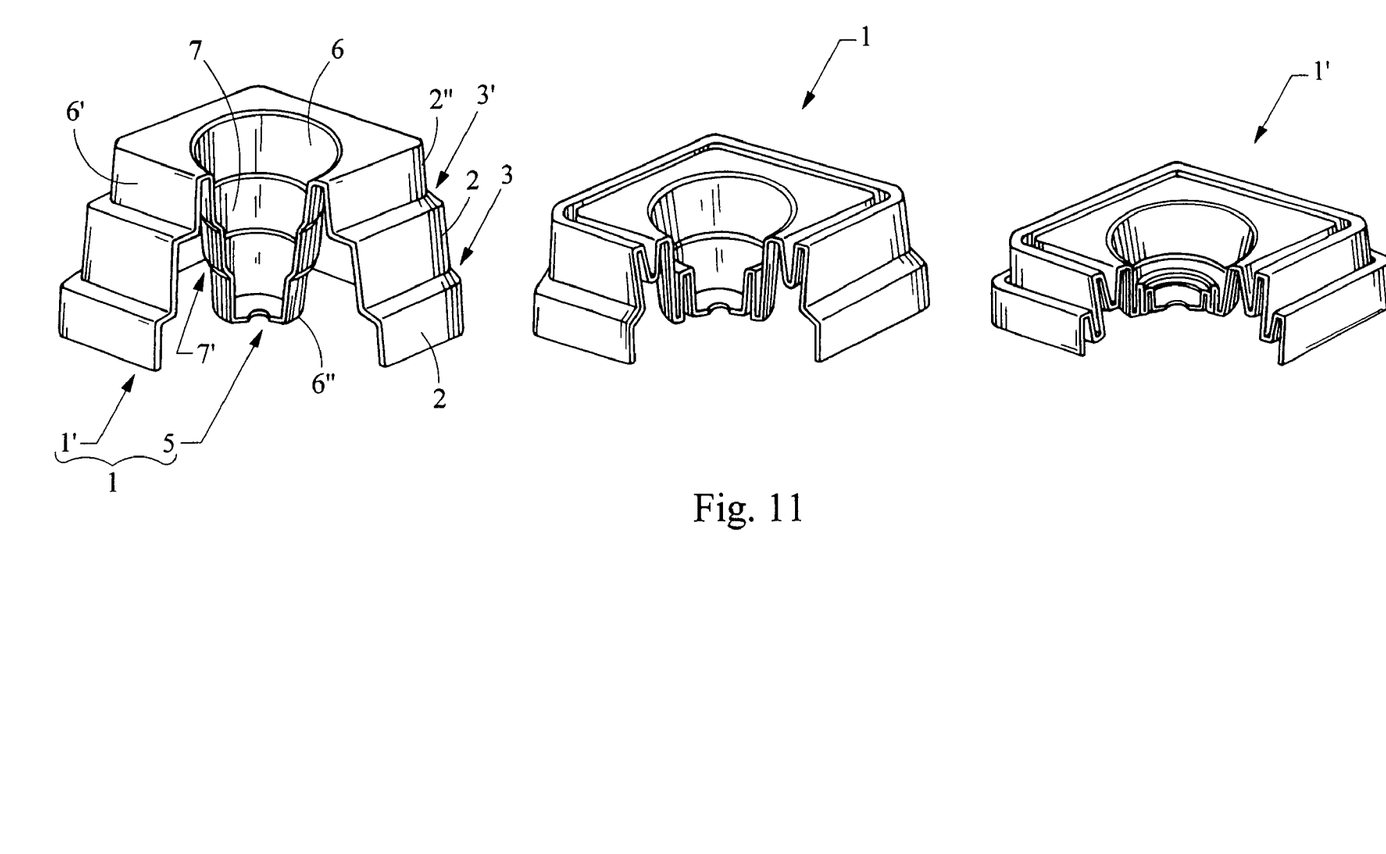
FIG. 11 illustrates, in three sequences, the sequential crushing of another variant of a three-step, double walled energy absorber device, according to the principles of the invention.

According to a second embodiment, seen in FIGS. 10 and 11 of the accompanying drawings, the envelope (forming the hollow body 1') extends in the region of the end of the segment 2", 2''' forming the top step towards the inside of said hollow body 1', so as to form a second hollow internal body 5 of generally conical or truncated shape, surrounded by the aforementioned hollow body 1' forming a hollow external body of reverse or opposite conicity to that of said hollow external body 1'.

Preferably, the hollow internal body 5 is made up of at least two hollow stepped segments 6, 6', 6", of which the individual envelopes are truncated or cylindrical, of the same type of shape of decreasing dimensions, and which are aligned with each other in an extension direction D'. A first end segment 6 located adjacent to the segment 2" or 2''' forming the top step of the hollow external body 1' and a second opposite end segment 6" proximal to the end segment 2 forming the base step of the hollow external body 1'. The various segments 6, 6', 6" of the hollow internal body 5 are connected to each other by an intermediate portion or portions 7, 7' defining steps recesses between the segments.

To achieve a structure that is concentric overall, the axes of extension and/or symmetry, also forming the directions of alignment D and D' of the respective segments 2, 2', 2", 2''' and 6, 6', 6" of the hollow internal 5 and external 1' bodies, are identical. In addition, the total heights in the common direction D and D' of the two bodies 1' and 5 are advantageously identical. This obtains the same crushing range for both hollow bodies 1' and 5. Also, advantageously, the intermediate portions 7, 7' of the hollow internal body 5 are offset in the common direction of alignment D, D' in relation to the intermediate portions 3, 3', 3" of the hollow external body 1'.

The provision of a second hollow internal body 5 helps avoid buckling of the absorber device 1 in the region of the hinge area(s) during impact in a direction that is inclined in relation to the main direction of extension D of the hollow (external) body 1'. The provision of a hollow internal body 5 inside the first hollow body 1' and based on the same principles, but positioned in the opposite direction to the first, promotes both the resistance of the device to bending (the unstable hinge areas are not opposite each other), and still allows the part thus formed to be removed from the mould.

Energy absorption is therefore greatly increased (+80%) in relation to an unchanged or only slightly greater (+20%) diameter.

In accordance with one preferred embodiment of the invention (FIGS. 10 and 11), the hollow internal 5 and external 1' bodies have the same number of steps or segments 2, 2', 2", 2''' and 6, 6', 6", and thus have the same number of intermediate envelope portions 3, 3' and 7, 7', with the respective intermediate portions of said hollow internal 5 and external 1' bodies being arranged alternating with each other along the common direction of alignment D, D'.

In addition, the directrices of the cylindrical segments or the perimeters of the bases of the truncated segments of the hollow internal body 5 may or may not be based on the same geometric figure as the directrices of the cylindrical segments or the perimeters of the bases of the truncated segments of the hollow external body 1'. Advantageously, the walls of the various segments 6, 6', 6" of the hollow internal body 5, on the one hand, and the walls of the various intermediate portions 7, 7' connecting these segments, on the other hand, have identical thicknesses to each other respectively; these thicknesses being identical to or different from those of the walls of the segments 2, 2', 2", 2'" and of the intermediate portions 3, 3', 3'" respectively of the hollow external body 1'.

In addition, the rule of the ratio of heights h/h' that applies to the external body 1' may also be applied to the internal body 5 and, in this case, for a segment 6 of larger section of the hollow internal body 5 of height Y, the other or the at least two other segment(s) 6, 6" of smaller section(s) of this hollow internal body has(have) a height corresponding to about, and preferably equal to, 2Y, with preferably X=Y.

Although other materials (aluminium, steel, magnesium, etc.) are possible, the energy absorber device 1 is preferably made of a thermoplastic material, possibly reinforced, produced by injection moulding.

In addition, the size of the device 1, the thickness of its wall, the number of steps, the diameters thereof and other structural parameters may vary to adapt said device 1 to specific requirements of its application.

Figure 12:
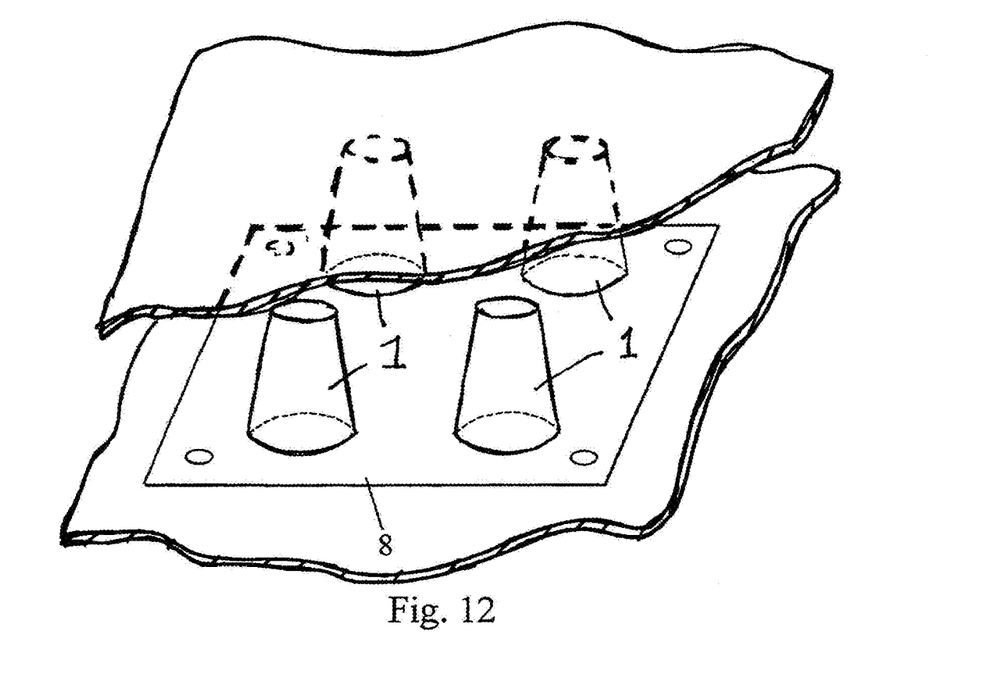
FIG. 12 is a diagrammatic view in perspective of a filling element comprising four energy absorber devices according to the invention, and, FIGS. 13A, 13B and 13C are views in perspective of additional variants of a device in accordance with the present invention.

The invention also relates to a filling element, in particular for the doors of motor vehicles, having impact or shock absorption properties and designed to be positioned between two surface bodies, such as two metal sheets for example, the filling element characterised in that it is formed of a plurality of energy absorber devices 1 as described above, connected to each other in the region of the free edges of the segments 2 forming the base steps of the hollow bodies 1', if applicable external, either directly, or by means of connection portions forming a baseplate 8. Such a construction is schematically shown in FIG. 12.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

The invention claimed is:

1. An energy absorber device comprising:
a hollow body having a plurality of stepped segments, each stepped segment being connected to an adjacent stepped segment by an intermediate portion, the stepped segments being of all the same general shape and being aligned with each other along a common axis, one of the stepped segments forming a base segment at one end of the device and another of the stepped segments forming a top at the opposing end of the device, the stepped segments being of decreased width proceeding from the base segment to the top segment, the base segment further having a height X and the other stepped segments having a height of about 2X, whereby, when said body is folded into itself by reversal of the stepped segments of smaller width generally telescopically into an adjacent stepped segment of larger width, a plateau of constant stress is produced during folding until a final peak of stress is produced by folding all of the stepped segments concentrically into the base segment, the base segment further having a width defined over its entire height X that is greater than the widths of all the other stepped segments.

2. The device of claim 1, wherein each intermediate portion has a first curved area extending a bottom portion of the segment of smaller width generally radially outward in a generally concave shape, each intermediate portion also having a second curved area extending a top portion of the segment of larger width generally radially inward in convex shape, the first and second curved areas being connected at a line of inflection.

3. The device of claim 1, wherein the walls of each of the segments are of a first thickness, and the walls of each of the intermediate portions are of a second thickness so that crushing with plastic return of the hollow body progressively affects the segments beginning with the segment with the smallest width forming the top step.

4. The device of claim 1, wherein the wall of at least one of the segments has a different thickness than that of the walls of the other segments.

5. The device of claim 1, wherein the directrices or the perimeters of the bases of the segments are chosen from the group of geometric figures having a centre of symmetry, the direction of alignment and extension of the hollow segments being the same as the axis of symmetry thereof.

6. The device of claim 1, wherein the directrices or the perimeters of the bases of the segments are chosen from the group of geometric figures having at least one axis of symmetry, the segments each having at least one plane of symmetry and the planes of symmetry of the segments being identical to each other.

7. The device of claim 1, wherein the hollow body is generally conical in shape.

8. The device of claim 1, wherein the segments are one of a cylindrical or truncated conical shape.

9. The device of claim 1, formed of a plastic material.

10. A plurality of the device of claim 2 incorporated between two surface bodies of a motor vehicle door, the plurality of devices being connected to each other in the region of their base segments.

11. An energy absorber device comprising:
a hollow body having a plurality of stepped segments connected together by at least one intermediate portion, the stepped segments being of all the same general shape and being aligned with each other along a common axis, one of the stepped segments forming a base segment at one end of the device and another of the stepped segments forming a top at the opposing end of the device, the stepped segments being of decreased width proceeding from the base segment to the top segment, the base segment further having a height X and the other stepped segments having a height of about 2X, wherein said body is suitable for being crushed into itself by reversal of the stepped segments of smaller width generally telescopically into an adjacent stepped segment of larger width,
wherein the hollow body is a hollow external body and the top segment thereof extends toward the inside of the hollow external body and thereafter forms a hollow internal body surrounded by the hollow external body, the hollow internal body being of opposite conicity to that of the hollow external body.

12. The device of claim 11, wherein the hollow internal body includes at least two internal stepped segments connected by at least one internal intermediate portion and being of the same general shape and being aligned with each other along a common axis, the internal segments being of decreased width proceeding from an internal segment adjacent to the top segment of the external hollow body to another internal segment adjacent to the base segment of the external hollow body.

13. The device of claim 11, wherein the hollow internal body and the hollow external body are of about the same height.

14. The device of claim 11, wherein the hollow internal body and the hollow external body are aligned along a common axis.

15. The device of claim 11, wherein the intermediate portions of the hollow internal body are offset in relation to the intermediate portions of the hollow external body.

16. The device of claim 12, wherein the hollow internal and external bodies have the same number of segments and intermediate portions, the respective intermediate portions of the hollow internal and external bodies being arranged offset with each other along the common axis.

17. The device of claim 13, wherein the directrices or the perimeters of the internal segments are based on the same geometric figure as the directrices or the perimeters of the bases of the segments of the hollow external body.

18. The device of claim 12, wherein the internal segments are each of the same thickness as the internal intermediate portions are each of the same thickness.

19. The device of claim 12, wherein the internal segment of largest width has a height corresponding to about 2Y.

20. The device of claim 19, wherein X=Y.

* * * * *